(12) United States Patent
Kohn

(10) Patent No.: US 6,252,699 B1
(45) Date of Patent: Jun. 26, 2001

(54) DEVICE WITH OPTICAL FIBRE AMPLIFIER

(75) Inventor: Ulrich Kohn, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/000,190

(22) PCT Filed: Aug. 29, 1997

(86) PCT No.: PCT/DE96/01594

§ 371 Date: Jan. 2, 1999

§ 102(e) Date: Jan. 2, 1999

(87) PCT Pub. No.: WO97/09757

PCT Pub. Date: Mar. 13, 1997

(30) Foreign Application Priority Data

Aug. 29, 1996 (DE) .............................................. 195 32 485

(51) Int. Cl.[7] .............................. H01S 3/06; H01S 3/13; H04B 10/02
(52) U.S. Cl. ........................... 359/337; 359/177; 359/341
(58) Field of Search .................... 359/110, 161, 359/176, 177, 194, 337, 341

(56) References Cited

U.S. PATENT DOCUMENTS 5,485,299 * 1/1996 Jones ..................................... 359/179
5,500,756 * 3/1996 Tsushima et al. .................... 359/177

FOREIGN PATENT DOCUMENTS

8289586 * 11/1995 (GB) .
7015055 * 1/1995 (JP) .
777346 * 6/1997 (RU) .

OTHER PUBLICATIONS

Kohn, U.; Elektronik Prexis, vol. 28, #9, pp. 44–46, May 6, 1993.*
Murahami et al, Jour. of Lightwave Techn., vol. 14, pp. 671–677.*
Electronic Letter, vol. 30, No. 12, pp. 962–963.

* cited by examiner

*Primary Examiner*—Nelson Moskowitz
(74) *Attorney, Agent, or Firm*—Michael J. Striker

(57) ABSTRACT

A device with an optical fiber amplifier, wherein a control circuit is provided for stabilizing the amplification. In the control circuit, a supplemental optical signal (z) is supplied to the input of the fiber amplifier within its optical amplification bandwidth. The level of the former is controlled by a control member (Q), to whose first input a first measuring signal (m1) is supplied, which represents the level of an optical signal, amplified by the fiber amplifier (V), from a first area of the amplification bandwidth. A second measuring signal (m2) is present at the second input of the control member, which represents the level of a not yet amplified optical signal from the second area of the amplification bandwidth.

5 Claims, 1 Drawing Sheet

DEVICE WITH OPTICAL FIBRE AMPLIFIER

PRIOR ART

Figure 1:
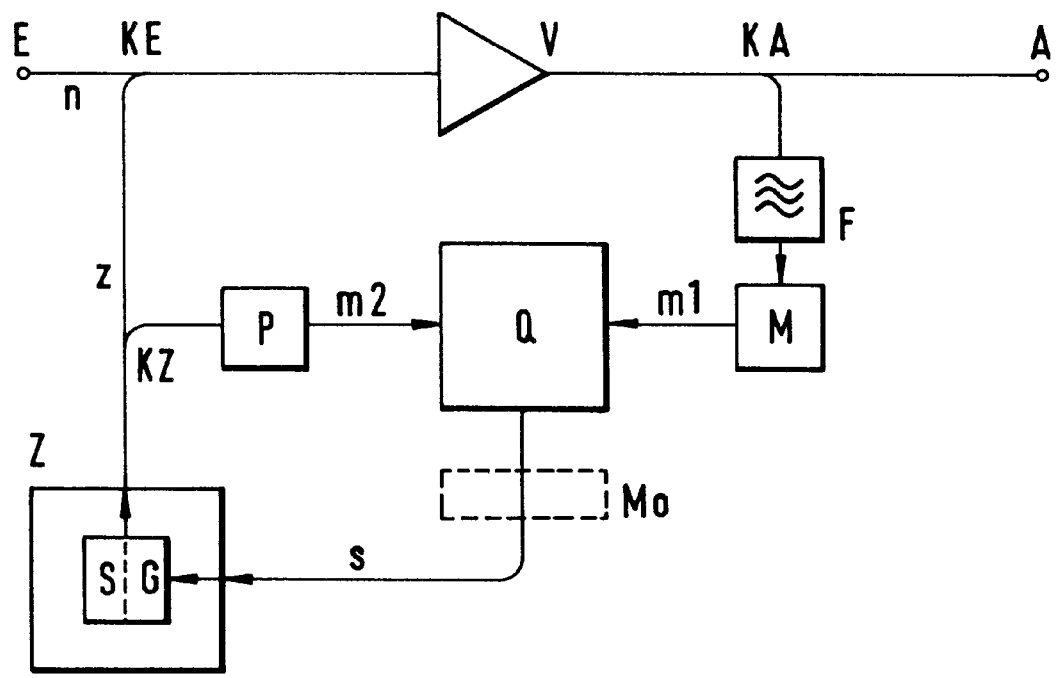

The invention relates to the species as recited in independent claim 1. At least in connection with erbium-doped fiber amplifications in multi-channel systems, the dependency of the amplification from the output of the optical input signals can result in that changes in the output of the optical input signal of one channel affect the amplification of the fiber amplifier regarding the optical channels of another channel. A stabilization of the amplification allows a simpler adaptation of a fiber amplifier to various situations.

A method for stabilizing the amplification is disclosed in ELECTRONIC LETTERS, Vol. 30, No. 12, pages 962 to 963, wherein the amplification is maintained by a resonator, which prefers a defined wave length. Other methods, which deal with dynamic or automatic amplification regulation, are also mentioned there.

ADVANTAGES OF THE INVENTION

The subject of the application with the characteristics of claim 1 has the following advantage: in a simple manner it makes it possible to maintain the amplification approximately constant. The amplification can be varied within defined limits; in this way it is possible to adapt the fiber amplifier to different system requirements.

DRAWINGS

Figure 2:
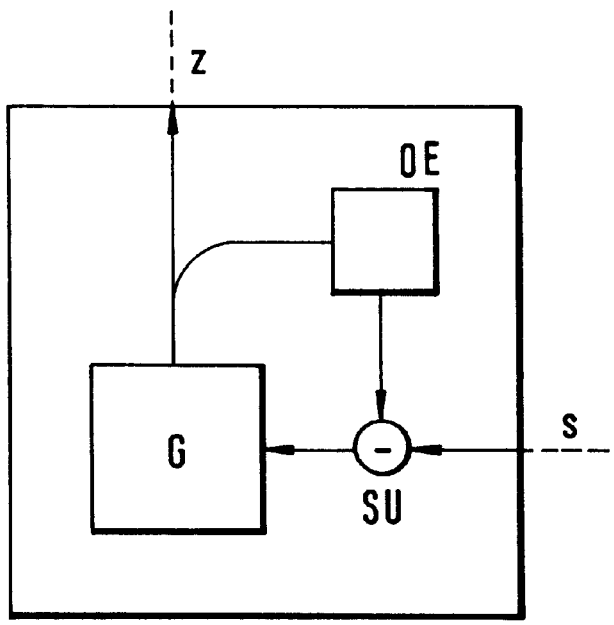

An exemplary embodiment of the invention is represented in the drawings and will be explained in more detail in the following description. Shown are in:

FIG. 1, in accordance with the invention an optical fiber amplifier with an accessory device in a control circuit for regulating the amplification;

FIG. 2, a possibility of designing the

DESCRIPTION OF THE EXEMPLARY EMBODIMENTS

The following items in the drawing figures mean:

E: Input of the device with control circuit;
A: Output of the device with control circuit;
V: Fiber amplifier, connected by means of optical waveguides with the input E, or respectively the output A;
n: Useful optical signal at the input E;
z: Supplemental optical signal which is coupled into the optical waveguide on the input side in addition to the useful signal n;
Z: Accessory device transmitting the supplemental signal;
S: Control device;
s: Control signal;
G: Generator (optical transmitter, for example laser);
P: Level meter for the output of the accessory signal;
M: Measuring device for the output of an optical signal;
m1, m2: Measuring signals;
Q: Control member, in which the quotient of m1/m2 is formed;
F: Optical filter;
Mo: Optionally employable electrical modulator;
OE: Opto-electrical converter;
SU: Subtraction member.

Details which are obvious to one skilled in the art have been omitted. For example, insulators in the path of the optical wave guides have been omitted for the sake of clarity. How the command variable is supplied to the control circuits is also not shown.

Function of the Preferred Examplary Embodiment

Useful optical signals n, which are supplied through an optical waveguide to the input of an optical fiber amplifier V, are present at the input E of the preferred device in accordance with FIG. 1. An optical wave guide is extended from its output to the output A of the device. A portion of the optical output signal of the fiber amplifier V is coupled out with the aid of a conventional optical coupler KA and reaches an optical filter F, whose conducting range corresponds to the frequency range, and therefore also the wavelength range, of a supplemental optical signal z, which is superimposed on the useful signals n by means of a conventional coupler KE. The supplemental signal preferably only has a single wavelength, and the filter accordingly selects on as narrow a band as possible.

The supplemental signal originates from an accessory device Z, which contains a generator G for the supplemental optical signal z, for example a laser or a laser diode. Furthermore, a control device S is provided in the accessory device Z which, by means of a control signal s, makes possible the control of the amplitude or intensity of the supplemental signal z generated by the generator G.

A portion of the supplemental signal z is coupled out by means of a coupler KZ and supplied to a level meter P. The output signal of the latter is designated as the measuring signal m2 and is a measurement for the output of the supplemental signal z.

A measuring device for the output of the optical signal leaving the filter F follows the optical filter F. Accordingly, the measurement m1, emitted by the measuring device M, is a measurement for the output of those optical signals leaving the fiber amplifier V, to the extent that they have the wavelength of the supplemental signal. The measuring signals m1 and m2, which are a measurement of the output of the amplified, or respectively not yet amplified supplemental signal z, are supplied to a control member Q, which forms the quotient from m1 and m2, which is a measurement for the amplification of the fiber amplifier V. The formation of the quotient can preferably be performed in that the electrical measuring signals m1 and m2 are initially analog/digitally converted in the control member and are thereafter digitally processed in a processor. The result then is the control signal s, which controls the amplitude or intensity of the supplemental signal z via the accessory device Z.

It is achieved by means of the described control circuit that, independently of the output of the useful signals n, a supplemental signal z of such strength is always supplied to the input of the fiber amplifier V, that its amplification represented by the control signal s remains constant to a large degree.

A possibility for designing the accessory device Z is indicated in FIG. 2. The generator G provides the supplemental signal z directly to the output of the accessory device Z. The control signal s from FIG. 1 reaches a control circuit for the generator G as the command variable. This control circuit contains an opto-electrical converter OE, for example a monitor diode, whose output signal is supplied to a subtraction member SU, whose output signal in turn controls the intensity, or respectively the amplitude, of the supplemental signal by means of a direct action on the generator G.

Depending on whether the subtraction member SU operates analogously or digitally, it is necessary to provide an A/D or D/A converter in one or the other of its input lines.

By means of the control circuit represented in FIG. 1, it is achieved that the amplification of the supplemental signal z by the fiber amplifier V is maintained constant to the greatest extent, independently of what output (within defined limits) the useful signals of individual channels or all channels have. The fiber amplifier is preferably operated at a defined saturation degree, so that by means of the control it is achieved that this saturation degree is maintained, even if, for example, the useful signal of a channel within the multi-channel system is shut off at the input E.

A variation possibility is moreover indicated in FIG. 1. It is possible by means of a modulator Mo to modulate the supplemental signal z, which is used as a carrier here, with information signals of a supplemental channel, for example with service data or control signals. The optical frequency of the useful signal is preferably placed at the edge of the amplification bandwidth of the fiber amplifier V. An amplifier with an erbium-doped amplification fiber is preferably selected as the optical fiber amplifier.

What is claimed is:

1. A device with an optical fiber amplifier, having a control circuit for stabilizing the amplification, characterized by the following structure of the control circuit: a supplemental optical signal (z), whose level is controlled by a control member (Q), is supplied to the input of the fiber amplifier (V) within its optical amplification bandwidth, wherein a first measuring signal (m1) is supplied to the first input of the control member (Q), which represents the output of the supplemental optical signal amplified by the fiber amplifier (V), while a second measuring signal (m2), which represents the output of the not yet amplified supplemental optical signal, is present at the second input of the control member (Q).

2. The device in accordance with claim 1, characterized in that the optical frequency of the supplemental optical signal (z) lies between the optical frequency or optical frequencies of useful signal (n) to be amplified and one of the two boundary frequencies of the amplification bandwidth.

3. The device in accordance with claim 1, characterized in that an optical filter (F) for filtering out the amplified supplemental signal is connected between the output of the fiber amplifier (V) and a measuring device (M) emitting the first measuring signal (m2).

4. The device in accordance with claim 1, characterized in that the supplemental signal (z) is used as the carrier of information signals of supplemental channel.

5. The device in accordance with claim 1, characterized in that the fiber amplifier (V) is an erbium-doped amplifier fiber.

* * * * *